(12) United States Patent
Pande et al.

(10) Patent No.: US 7,630,737 B2
(45) Date of Patent: *Dec. 8, 2009

(54) METHOD AND SYSTEM FOR SENDING LOCATION CODED IMAGES

(75) Inventors: Ashutosh Pande, San Jose, CA (US); Kanwar Chadha, Los Gatos, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/269,126

(22) Filed: Nov. 7, 2005

(65) Prior Publication Data

US 2006/0111143 A1 May 25, 2006

Related U.S. Application Data

(63) Continuation of application No. 10/490,786, filed as application No. PCT/US02/32477 on Oct. 9, 2002.

(60) Provisional application No. 60/327,900, filed on Oct. 9, 2001.

(51) Int. Cl.
*H04W 24/00* (2006.01)

(52) U.S. Cl. .............. 455/556.1; 455/456.5; 455/457; 455/456.3; 455/566; 455/414.3; 340/995.19; 340/995.22; 340/995.24; 701/201; 701/213

(58) Field of Classification Search .............. 455/456.5, 455/457, 566, 456.1, 556.1; 382/115, 209; 463/25; 701/213; 340/995.22, 995.24
See application file for complete search history.

(56) References Cited

U.S. PATENT DOCUMENTS

| | | | | |
|---|---|---|---|---|
| 6,091,956 A * | 7/2000 | Hollenberg | .............. | 455/456.5 |
| 6,115,611 A * | 9/2000 | Kimoto et al. | .......... | 455/456.3 |
| 6,233,523 B1 * | 5/2001 | Sood | .......................... | 701/213 |
| 6,269,246 B1 * | 7/2001 | Rao et al. | ................. | 455/456.3 |
| 6,411,811 B2 * | 6/2002 | Kingdon et al. | .......... | 455/456.5 |
| 6,456,852 B2 * | 9/2002 | Bar et al. | ................. | 455/456.1 |
| 6,522,889 B1 * | 2/2003 | Aarnio | ..................... | 455/456.5 |
| 6,625,457 B1 * | 9/2003 | Raith | ....................... | 455/456.1 |
| 6,650,889 B1 * | 11/2003 | Evans et al. | .............. | 455/412.1 |
| 6,677,894 B2 * | 1/2004 | Sheynblat et al. | ......... | 342/357.1 |
| 6,748,225 B1 * | 6/2004 | Kepler | ..................... | 455/456.2 |
| 6,947,755 B1 * | 9/2005 | Gould et al. | .............. | 455/456.5 |
| 7,015,831 B2 * | 3/2006 | Karlsson et al. | .......... | 340/995.1 |
| 7,535,492 B2 * | 5/2009 | Kahn et al. | .............. | 348/211.1 |
| 2001/0022558 A1 * | 9/2001 | Karr et al. | .................... | 342/450 |
| 2003/0060215 A1 * | 3/2003 | Graham | ...................... | 455/456 |
| 2003/0069029 A1 * | 4/2003 | Dowling et al. | ............. | 455/456 |
| 2004/0110515 A1 * | 6/2004 | Blumberg et al. | ......... | 455/456.1 |
| 2004/0198386 A1 * | 10/2004 | Dupray | .................... | 455/456.1 |

* cited by examiner

*Primary Examiner*—Sharad Rampuria
(74) *Attorney, Agent, or Firm*—K&L Gates LLP

(57) ABSTRACT

A system is described that utilizes an imager in a wireless device in a wireless network and tags a digital image with positioning data.

18 Claims, 5 Drawing Sheets

METHOD AND SYSTEM FOR SENDING LOCATION CODED IMAGES

CROSS-REFERENCE TO RELATED APPLICATIONS

This application is a continuation of U.S. patent application Ser. No. 10/490,786, filed on Mar. 23, 2004, and titled "METHOD AND SYSTEM FOR SENDING LOCATION CODED IMAGES OVER A WIRELESS NETWORK", by Ashutosh Pande and Kanwar Chadha, which claims the benefit of Patent Cooperation Treaty (PCT) Patent Application PCT/US02/32477, filed on Oct. 9, 2002, titled "METHOD AND SYSTEM FOR SENDING LOCATION CODED IMAGES OVER A WIRELESS NETWORK", by Ashutosh Pande and Kanwar Chadha, which claims the benefit of Provisional Patent Application Ser. No. 60/327,900, filed on Oct. 9, 2001, and titled "METHOD AND SYSTEM FOR SENDING LOCATION CODED IMAGES OVER A WIRELESS NETWORK," by Ashutosh Pande and Kanwar Chadha which are herein incorporated by reference.

BACKGROUND OF THE INVENTION

1. Field of the Invention

This invention relates generally to the use of an image-sensing device in connection with a wireless communication device in conjunction with a location determination element.

2. Related Art

The worldwide utilization of wireless devices such as two-way radios, portable televisions, personal communication system ("PCS"), personal digital assistants ("PDAs") cellular telephones (also known a "mobile phones"), Bluetooth, satellite radio receivers and Satellite Positioning Systems ("SPS") such as Global Positioning Systems ("GPS"), also known as NAVSTAR, is growing at a rapid pace.

When emergencies occur, people are used to dialing 911 (normally referred to as a "911" call) on a land telephone and contacting an emergency center that automatically is able to identity the location of the land telephone where the call originated. Typically, wireless devices are unable to communicate their location without a person entering or describing their location. The United States Congress, through the Federal Communications Commission (FCC), has enacted a requirement that cellular telephones be locatable to within 50 feet once an emergency call, such as an "Enhanced 911" (also known as E911), is placed by a given cellular telephone. This type of position data would assist police, paramedics, and other law enforcement and public service personnel, as well as other agencies that may need to have legal rights to determine the position of specific cellular telephone. The "E911" services, however, operate differently on wireless devices than a 911 call does on land-line telephones.

When a 911 call is placed from a land-line telephone, the 911 reception center receives the call and determines the origin of the call. In case the caller fails, or forgets, to identify his or her location, the 911 reception center is able to obtain the location from which the call was made from the public telephone switching network (PSTN) and send emergency personnel to the location of the call.

If instead, an E911 call is placed from a wireless device such as a cellular telephone, the E911 reception center receives the call but cannot determine the origin of the call. If the caller fails, or forgets, to identify his or her location, the E911 reception center is unable to obtain the location of the call because the wireless network is different than the PSTN. At present, the best that the E911 reception center may do is to determine the location of the cell site from which the call was placed. Unfortunately, typical cell sites in a wireless network system may cover an area with approximately a 30-mile diameter. Further refinement of the location may be determinable in a digital network by the power setting of the calling wireless device. But, this still results in an area covering multiple miles.

A proposed solution to this problem has been to utilize a wireless positioning system that includes satellites and/or pseudolites (such as base station) to triangulate the position of a wireless device such as a cellular telephone. GPS is an example of a Satellite Positioning System (SPS) that may be utilized by a wireless device in combination with an appropriate GPS receiver to pinpoint the location of the wireless device on earth. For example, U.S. Pat. No. 5,874,914, issued to Krasner, which is incorporated by reference herein, describes a method wherein the base station transmits GPS satellite information, including Doppler information, to a remote unit using a cellular data link, and computing pseudoranges to the in-view satellites without receiving or using satellite ephemeris information. Another proposed solution requires multiple displays and transmission of location data and image data to a receiving device without being associated. For example, U.S. Patent Application No. 200020077123 A1, applied for by Shuji et al., which is incorporated by reference herein.

The array of GPS satellites in a SPS transmits highly accurate, time coded information that permits a receiver to calculate its exact location in terms of latitude and longitude on earth as well as the altitude above sea level. The GPS system is designed to provide a base navigation system with accuracy to within 100 meters for non-military use and greater precision for the military (with Selective Availability ON).

The space segment of the GPS system is a constellation of satellites orbiting above the earth that contain transmitters, which send highly accurate timing information to GPS receivers on earth. The fully implemented GPS system consists of 21 main operational satellites plus three active spare satellites. These satellites are arranged in six orbits, each orbit containing three or four satellites. The orbital planes form a 55° angle with the equator. The satellites orbit at a height of 10,898 nautical miles (20,200 kilometers) above earth with orbital periods for each satellite of approximately 12 hours.

Each of the orbiting satellites contains four highly accurate atomic clocks. These provide precision timing pulses used to generate a unique binary code (also known as a pseudo random or pseudo noise "PN" code) that is transmitted to earth. The PN code identifies the specific satellite in the constellation. The satellite also transmits a set of digitally coded ephemeris data that completely defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the exact position of the satellite above the earth at any given time. A ground control station updates the ephemeris data of the satellite once per day to ensure accuracy.

A GPS receiver configured in a wireless device is designed to pick up signals from three, four, or more satellites simultaneously. The GPS receiver decodes the information and, utilizing the time and ephemeris data, calculates the approximate position of the wireless device. The GPS receiver contains a floating-point processor that performs the necessary calculations and may output a decimal display of latitude and longitude as well as altitude on the handset. Readings from three satellites are necessary for latitude and longitude information. A fourth satellite reading is required in order to compute altitude.

These techniques, however, still do not perform well in dense environments where the location of a wireless device (such as a cellular telephone) is usually hindered in dense environments such as downtown city blocks. A SPS system within the wireless device should have the capability to acquire and track the SPS satellites under the conditions that the typical user of a wireless device will encounter. Some of these conditions include utilization of the wireless device indoors and in dense urban areas that have a limited sky view, such as in downtown areas with skyscrapers blocking the views of the normally available satellites, etc. While these environments are typically manageable for terrestrial-based wireless communications systems, they are difficult environments for a SPS system to operate. For example, traditional "autonomous mode" SPS systems (i.e., SPS systems where the SPS receiver acquires the signals from the SPS satellites, tracks the satellites, and, if desired, performs navigation without any outside information being delivered to the SPS system) have problems with long Time To First Fix ("TTFF") times and, additionally, have a limited ability to acquire the SPS satellite signals under indoor or limited sky-view conditions.

Even with some additional information, TTFF times may be over thirty seconds because the ephemeris data must be acquired from the SPS system itself, and the SPS receiver typically needs a strong signal to acquire the ephemeris data reliably. These characteristics of a SPS system typically impact the reliability of position availability and power consumption in wireless devices. Typically, the accuracy of location-based solutions may vary from 30 meters to 300 meters in these types of environments. As a result locating a wireless device in a 300 meter radius zone is unlikely unless there are other methods to help narrow the search. Other location-based solutions may include network based location approaches such as Advance Forward Link Triangulation (AFLT, Cell ID, Enhanced Cell ID)), Angle of Arrival (AOA), Time of Arrival (TOA), and Enhanced Observed Time Difference (EOTD). Thus, location determination approaches include not only SPS system, but also network based location approaches.

It can be seen, then, that there is a need in the art for a method of sending additional surrounding information to more accurately locate the wireless communication device. It can also be seen that there is a need in the art for sending images with user position data to assist police, paramedics, and other law enforcement and public service personnel, as well as other agencies that may need to have legal rights in determining the location of a wireless device.

SUMMARY

A system for determining the approximate position (i.e., the location) of a wireless device, located within a cell of a wireless network, utilizing images in addition to user position data. The system includes a wireless device having a image capturing device and a way to derive location data. The location data may be derived at the wireless device or may be derived in a wireless network. A service center may function as an E911 center and contain a database of images that enable an operator to compare a received image with reference images retrieved from the database in order to locate a wireless device within a cell. Further, the system may have a call center that provides information in response to receipt of the image and location data.

The method performed by the system may include receiving image and location data from a wireless device at a call center and comparing the image to stored images associated with a predetermined area, such as a cell. Further, the method may send information back to the wireless device in response to the receipt of the image and location data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

A system is described that utilizes a wireless device located in a wireless network having an imager that is able to aid in identifying the location of the wireless device. The wireless device uses the imager to capture an image of a nearby reference point and transmits that image to a service center. The wireless device may append location information received from a satellite positioning system (SPS) or other location methods to the image. The image and location information is also available for transmission over the Internet or to a service center that can access a database of reference images or map/terrain information to assist in locating the position of the wireless device. The system may be a two-way system that also enables the service center to send information to the wireless device in response to receiving the image.

Figure 1:
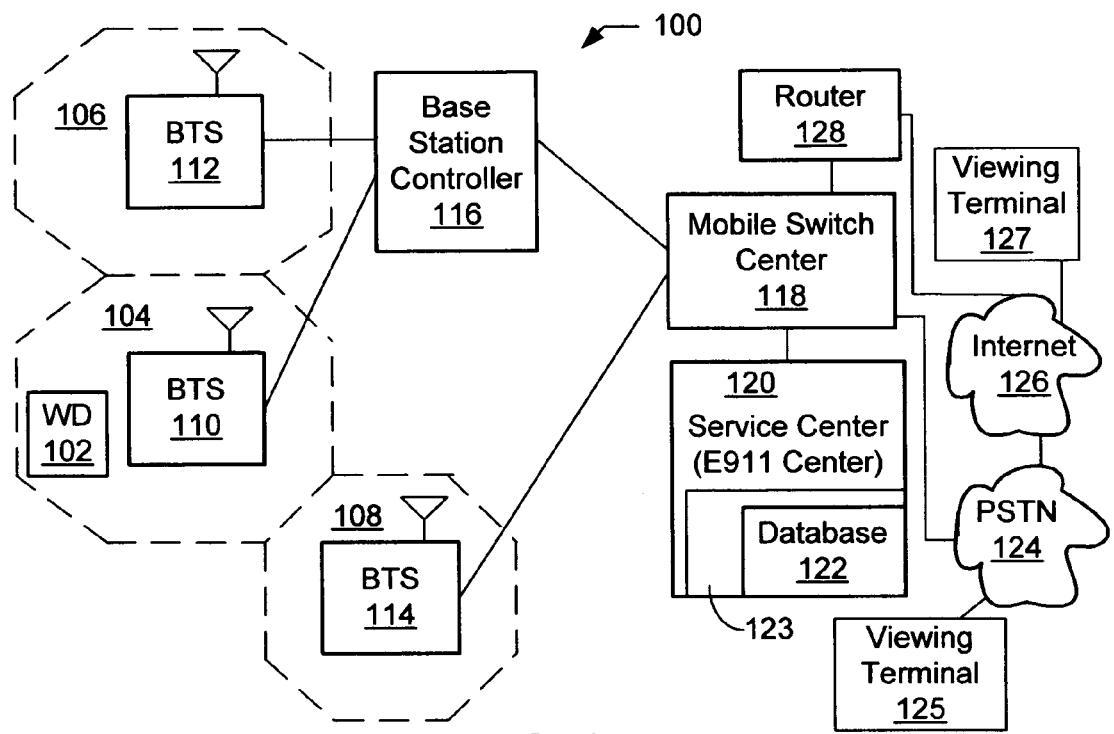
FIG. 1 is a graphical representation of a wireless device in a cell site that is part of wireless network depicted with three cell sites.

Referring to the drawings and initially to FIG. 1, a graphical representation of a wireless device 102 in a cell site 104 that is part of wireless network 100 depicted with three cell sites 104, 106 and 108. The wireless device is a depicted as a cellular telephone, but in alternate embodiments may be a pager, two-way radio, personal digital assistant (PDA), portable computer, or a tracking device. Different types of wireless devices may also be used within the same wireless network, for example a cellular phone and portable computer with a wireless modem may both be used in the wireless device.

Each cell site 104, 106 and 106 has a respective base transceiver station (BTS) 110, 112 and 114. A base station controller 116 is in communication with a mobile switch center (MSC) 118 and controls BTSs 110 and 112. BTS 114 is depicted as being directly connected to MSC 118. Different types of networks may use alternate configurations of cells, base stations and switch centers (mobile or PSTN based) while still supporting an embodiment of this invention.

The MSC 118 is in communication with a service center 120, such as an E911 center or customer service center. The service center 220 has access to a database 122 residing on a server 123 that may contain, for example, user's location, name, address, emergency contact, wireless features, and health records. The server 123 has an integrated display, but in an alternate embodiment the display may be one or more remote terminals or workstations. In an alternate embodiment the database 122 may reside on the MSC 118 or in some remote location within a network that is accessed by the service center 120.

Further, MSC 118 may be connected to a public switch telephone network (PSTN) 124 or another MSC (not shown). The MSC 118 may also be connected to a worldwide network, such as the Internet 126 via router 128. Further, the PSTN 124 and Internet 126 may be a single network that includes multiple protocols and connections. Viewing terminals 125 and 127 may be connected to the internet 126 and PSTN 124. The viewing terminal may be a personal computer, a wireless device, a dumb terminal, a personal digital assistant (PDA), video phone, a device on a wireless local area network, or any other device that may be found in a PSTN network 124 or Internet 126 capable of displaying or interpreting a digital image.

Figure 2:
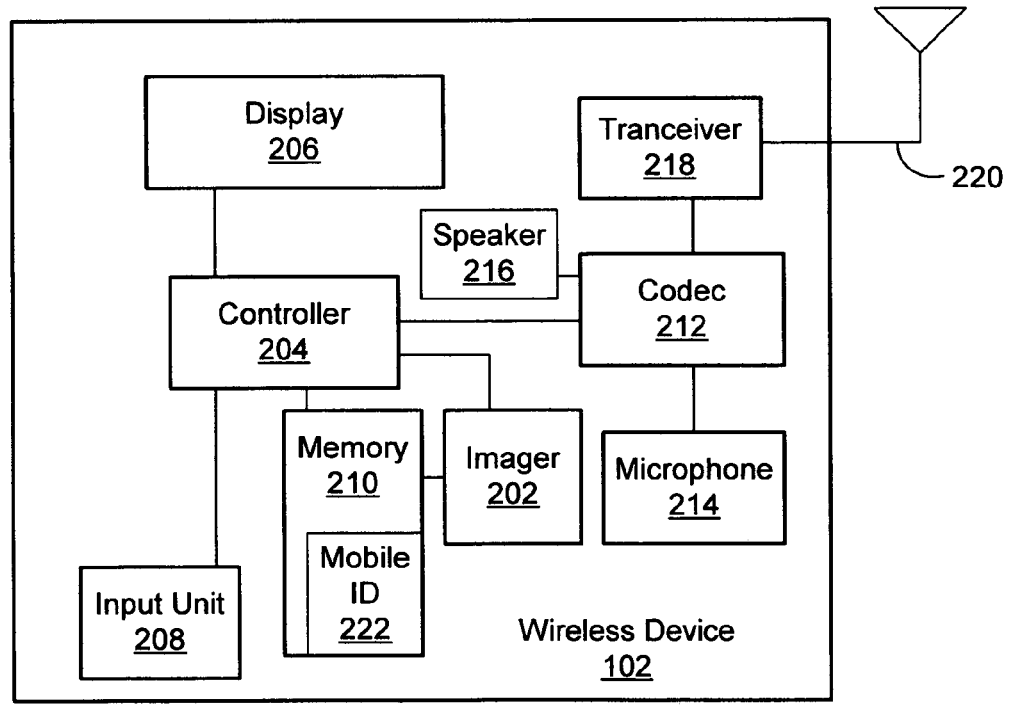
FIG. 2 is a block diagram of a wireless device of FIG. 1 having an imager.

Turning to FIG. 2, a block diagram of a wireless device 102 of FIG. 1 having an imager 202 is shown. The wireless device 102 has a controller 204 in electrical communication with the imager 202, a display 206, an input unit 208, a memory 210, and a codec 212. The imager 202 is also connected to memory 210. The codec 212 has an electrical connection with the controller 204, a microphone 214, a speaker 216, and a transceiver 218. In addition to the transceiver 218 having an electrical connection with the controller 204, the transceiver 218 is connected to an antenna 220 in order to receive and transmit radio frequency signals. The radio frequency signals may carry data and or voice signals encoded as CDMA, W-CDMA, CDMA-2000, TDMA, AMPS, TACS, UMTS, AM, or FM. Further, the transceiver 218 may be a receiver, a transmitter, or a combination of transmitter and receiver. The wireless device 102 is shown as a single mode CDMA wireless device, but in an alternate embodiment may be configured to receive multiple modes of encoded signals, for example a tri-niode cellular telephone.

The display 206 is a liquid crystal display. In alternate embodiments, the display 206 may be light emitting diodes, cathode ray tube, plasma display, VGA, or any other type of device able to present visual information. The controller 204 is a microprocessor, such as made by Motorola, Intel, and AMD. In an alternate embodiment, the controller may be an embedded controller, application specific integrated circuit (ASIC), discrete logic circuit implementing a state machine, analog circuits implementing a state machine, or a combination of analog circuits and discrete logic circuits.

The memory 210 represents both read only memory ROM and random access memory RAM. Further, memory 210 is shown with a mobile id 222 programmed into an electric erasable programmable memory (EEPROM). The input unit 208 includes a keypad and function buttons as commonly found on cellular telephones. When a button or series of buttons are entered, a signal is sent from the input unit 208 to the controller 204. In alternate embodiments, the input unit 208 may include keyboards, pointing devices (i.e. track ball, mouse, touch pad, or touch screen). Further, the input unit 208 with aid from the controller 204 may generate interactive audio voice prompts via the speaker 216 and audio input via the microphone 214. In yet another embodiment, a combination of the above input methods may be used.

The imager 202 is a charge coupled device (CCD) that is able to convert light energy into electrical charge and measure the electrical charge across a matrix of sensors. The charge measurements are then read and convened into a digital image. In an alternate embodiment, a CMOS imager may be used to generate a digital image. In yet another embodiment, any image pickup device, for example a video camera or scanning device, may be used as an imager 202.

The codec 212 converts analog audio signals from microphone 214 into digital signals and received digital speech signals into analog audio signals for speaker 216. The codec 212 is a 16-bit codec, but in other embodiments may be 8-bit, 16-bit or 32-bit. In yet another embodiment, the codec may be configurable depending on available bandwidth to between 8-bit and 32-bit coding.

The wireless device 102 is located in cell site 104 and may periodically provide location data to the wireless network 100. A multimode approach to location identification may be used in wireless network 100 along with the location data measured characteristics of cell site 104. The wireless device 102 provides the measured characteristics of cell site 104 to the MSC 118 and an approximate location of the wireless device 102 is identified. The wireless network 100 stores the positional information that is tagged with a mobile id 222 that is associated with wireless device 102 in database 122. Thus, a database of locations for the wireless device 102 is created that may be used to aid in locating a wireless device 102 at a time in the future.

When an emergency occurs and the wireless device 102 accesses the E911 function, a picture may be taken of a nearby reference, such as a building, sign or intersection. The digital image is captured by the imager 202 and placed in memory 210. The controller 204 then accesses the measured characteristics of the cell site 104 and transmits the digital image, mobile id 222 and measured characteristics of the cell site 104 to the service center (E911 center) 120 via the BTS 110, BSC 116, and MSC 118. The service center 120 accesses the database 122 with the mobile id 222 and determines an approximate location.

Due to the inability to pinpoint an exact location of a mobile within a cell site, a plurality of reference digital images is stored in database 122 and associated with cell site 104. A search is conducted on the reference digital images to find a match with the digital image from the wireless device 102. Displaying all the reference digital images and manually selecting the closest matching reference digital image determine the match. it is unlikely an exact match will occur, but a close match between the digital image and a reference image will enable a location to be ascertained. In an alternate embodiment, an algorithm may be used to automate identifying the match between the digital image and the reference digital images. If a history of location data for a wireless device 102 has been created and stored in the database 122, then that information may be accessed in addition to reference images to aid in making a match between the digital image and one of the reference digital images.

Once a match is achieved, a more precise location of the wireless device 102 is achieved and appropriate help may be sent. A further advantage of receiving a digital image at the service center 120 is that pictures of criminals or crimes may be sent to the service center 120 and relayed to authorities via the MSC 118, router 128 and Internet 126.

Yet another advantage of sending digital images to a service center 120 is the ability to give general assistance to the user of wireless device 102. If the user is a tourist and needs a list of tourist attractions that are nearby, he can capture a digital image of a nearby reference with imager 202 and via the input unit 208 enter a function key and request a list of tourist attractions. The digital image is transmitted along with the mobile id 222 and cell site characteristics. The service center 120 then processes the measured characteristics and digital image to determine the location of the wireless device 102. The service center 120 then returns a response that may be a digital image response containing a list of tourist attractions and their respective locations back to the wireless device 102.

In an alternate embodiment, a service center 120 may only receive a digital image at the service center 120 without cell site characteristics. The service center 120 then may access database 122 of reference digital images whose locations are known in order to find a match for the received digital image. If an intersection or business name is identified in the received digital image, then the service center 120 may search the Internet 126 using a world wide web (WWW) search engine for the business name or a proprietary database containing address and business names. Upon a successful name search, an address of the business is retrieved and the location of the wireless device 102 is identified. Help may be dispatched to the location if the service center 120 is an E911 center or information such as attractions, restaurants, or directions may be sent in response to a non-emergency request.

Figure 3:
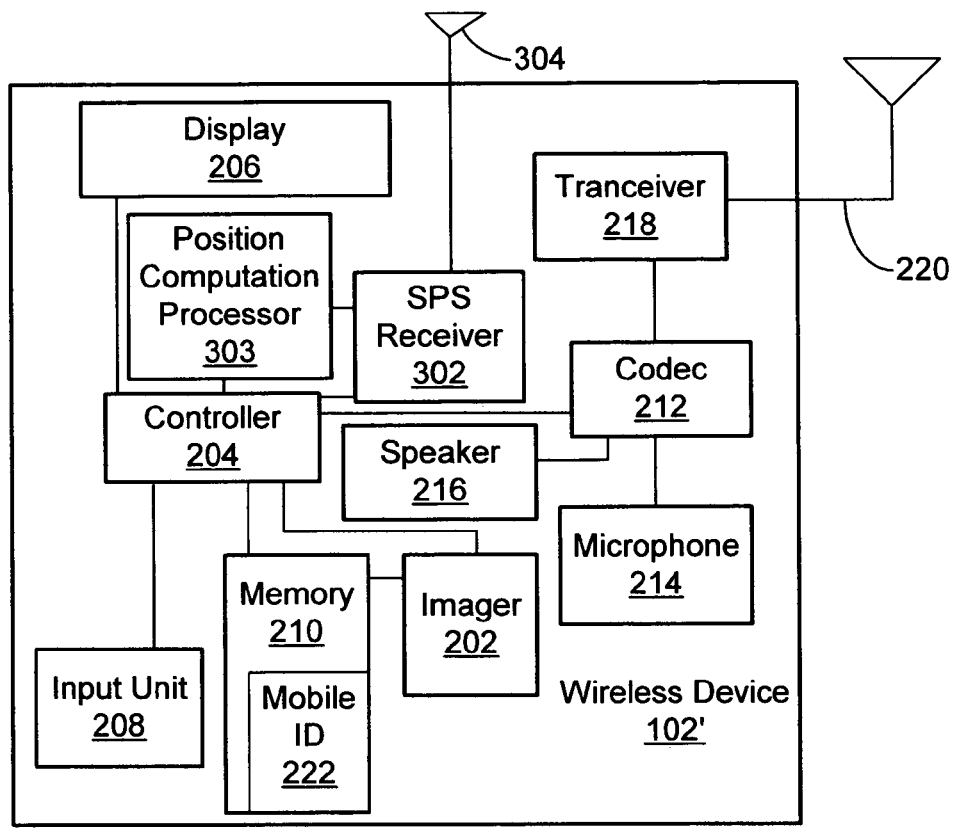
FIG. 3 is a block diagram of an alternate wireless device of FIG. 1 having an imager and satellite position system receiver.

In FIG. 3, a block diagram of an alternate wireless device 102' of FIG. 1 having an imager 202 and SPS receiver 302 is shown. In addition to the elements of FIG. 2, the SPS receiver 302 is connected to a position computation processor 303 and the controller 204. The SPS receiver 302 is a global positioning system (GPS) receiver and processor, such as implemented with SiRF Technologies' SiRFStarIIe chip set. The SPS receiver 302 is connected to a GPS antenna 304 for receiving satellite signals from a number of satellites that orbit earth. In another embodiment the GPS antenna 304 and antenna 220 may be the same antenna.

The position computation processor 303 is also connected to the controller 204 in addition to the SPS receiver 302. The position computation processor 303 is a digital signal processor that receives data from the SPS receiver 302 and other cell characteristics and sensor location data from other wireless positioning systems such as Bluetooth®, wireless local area networks, and/or LORAN networks. The position computation processor 303 computes the position and/or generates data, required by the server (123, FIG. 1) to determine the location data for the wireless device 102'. Examples of some data that may be used by the server 123 include but are not limited to pseudo ranges, cell ID, and received signal levels. In alternate embodiments, the position computation processor 303 may be combined with controller 204 or a second controller within the wireless device 102'.

The alternate wireless device 102' of FIG. 3 is able to activate the imager 202 via the input unit 208 in order to send a digital image to the service center 120. The digital image is associated with the location data generated by the position computation processor 303 and the SPS receiver 302. The digital image and location data are sent through the wireless network 100 via the BTS 110, BSC 116 and MSC 118 to the service center 120. The digital image may contain a picture of what emergency is occurring if E911 is being accessed. The operator at the E911 center is then able to send the appropriate help to the location identified with the received digital image. Further, if the SPS receiver 302 is unable to acquire the position signals and hence location data is lacking, then the computation processor 303 may associate data from other position systems or generate data for use by the server 123, FIG. 1, with the digital image. In an alternate embodiment, the location data from the SPS receiver 302 and data from other position systems/generated data may both, be associated with the digital image sent to server 123.

The location data may be lacking due to SPS receiver 302 having failed to acquire the appropriate number of satellites prior to the E911 transmission from the wireless device 102' or the signals may be blocked by mountains, trees or buildings. Further the location data sent with the digital image may contain up to a three hundred meter error. Such an error would be significant in a densely populated area, such as Los Angeles, Washington D.C., or Chicago.

If the sent digital image contains a nearby reference, then the database 122 containing reference digital images may be accessed at the service center 120 and a more precise location determined. Furthermore, the service center 120 may respond to a request for information from the wireless device 102 with a text or digital image containing maps, directions, locations of interest nearby, or even restaurant locations. In another embodiment of wireless network 100, both network centric location identification and GPS equipped wireless devices, such as wireless device 102', may be supported with location data being associated with digital images received from wireless devices.

Another service that may be provided by wireless network 100, is the ability to send digital images with location data to friends and relatives via the Internet 126 to viewing terminal 125 or viewing terminal 127. The digital image may be sent to a service center 120 that accesses a database 122 of email addresses associated with the digital image. The service center 120 then forwards the digital image along with associated location data to the viewing terminal 125 and/or viewing terminal 127. Upon the digital image being opened, additional information may be gathered based on the location data, such as a map showing the location where the digital image was captured, historic facts about the location, etc. In an alternate embodiment, an email address may be entered at the wireless device resulting in the digital image being sent Through the network to the viewing terminals 125 and 127. In yet another embodiment, the wireless device 102 may send the digital image through the network to another wireless device.

Figure 4:
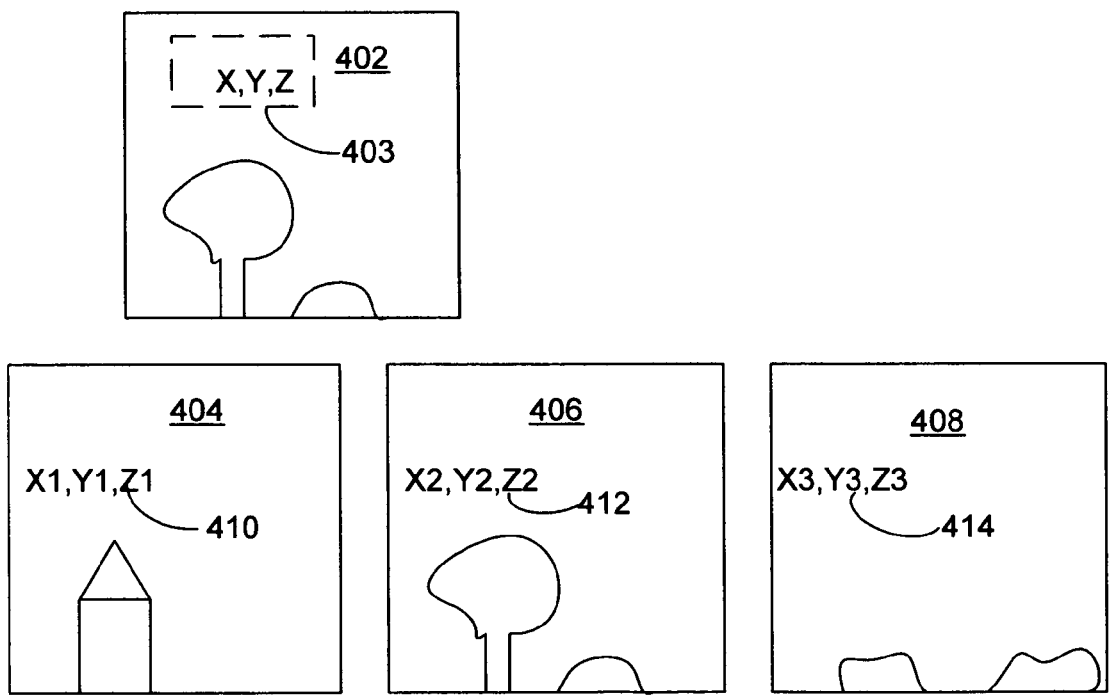
FIG. 4 is an illustration of a digital image from the wireless device of FIG. 1 and reference digital images located in the database of the service center.

Turning to FIG. 4, an illustration of a digital image 402 from the wireless device 102 of FIG. 1 and reference digital images 404, 406 and 408 located in the database 122 of the service center 120 is shown. The digital image 402 may contain location data 403 from the network or SPS receiver 302. Upon receiving the digital image 402 from the wireless device 102 in cell site 104 at the service center 120, a plurality of reference digital images 404, 406 and 408 associated with cell site 104 are accessed. Each of the reference digital images 404, 406 and 408 have a respective location 410, 412 and 414 associated with the image. An operator then compares the received digital image 402 with the reference images 404, 406 and 408, and determines there is a match with reference digital image 406. The location of the reference digital image 406 is exactly known as X2, Y2 and Z2 412, thus giving an accurate approximation for the wireless device 102.

Figure 5:
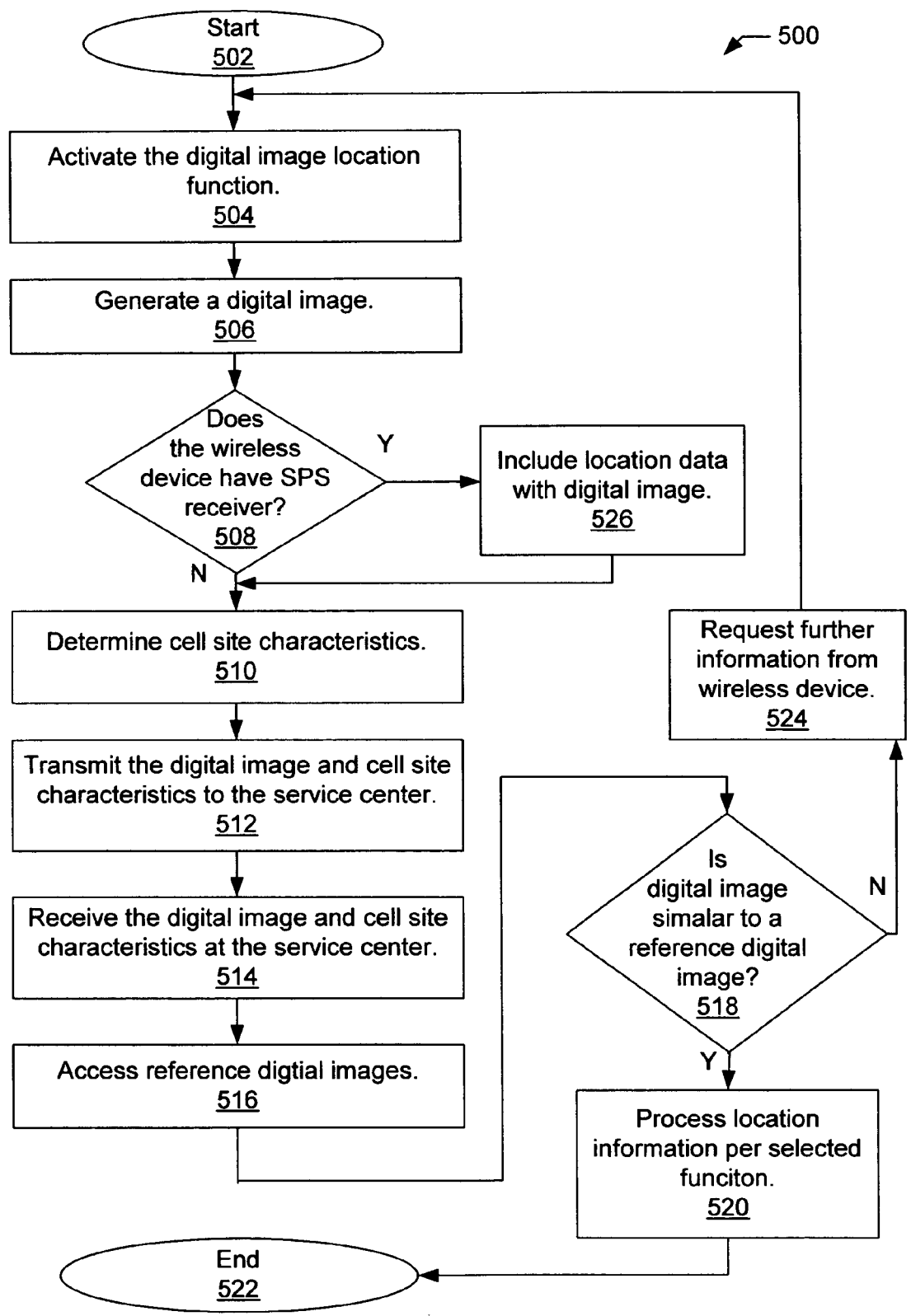
FIG. 5 is a flow diagram of a process of associating location information with an image generated by the wireless device of FIG. 2.

Turning now to FIG. 5, a flow diagram 500 of a process of associating location information with an image generated by wireless device 102 of FIG. 2 is shown. The process starts 502, by the user activating the digital image location function on wireless device 102 via the input unit 208 in step 504. The imager 202 in step 506 generates a digital image. If the wireless device 102 in step 508, has a SPS receiver 302, then in step 526 the location data from the SPS receiver 302 is associated with the digital image. The association of the location data with the digital image is made by linking text location data with the digital image. In an alternate embodiment, the text location data may be superimposed onto the digital image.

The wireless device 102 determines the cell site characteristics for example by measuring the signal strength of the different received channels, signal-to-noise ratios, and power settings of cell site 104 in step 510. The wireless device 102 then transmits the digital image and cell site characteristics to the service center 120 via the wireless network 100 in step 512. The service center 120 receives the digital image and cell site characteristics in step 514. In step 516, the reference digital images are accessed from database 122 using the cell site characteristics and the associated location data from the SPS if available. The digital image is compared to the references images in step 518. If a match is found in step 518, then processing of the location information occurs per the selected function in step 520 and processing is completed in step 522. Examples of different functions are E911, location assistance and points of interest. If the location cannot be ascertained in step 218, then a request is sent for further information from the wireless device 102 in step 524. The process is then repeated with another image being transferred to the service center 120.

Figure 6:
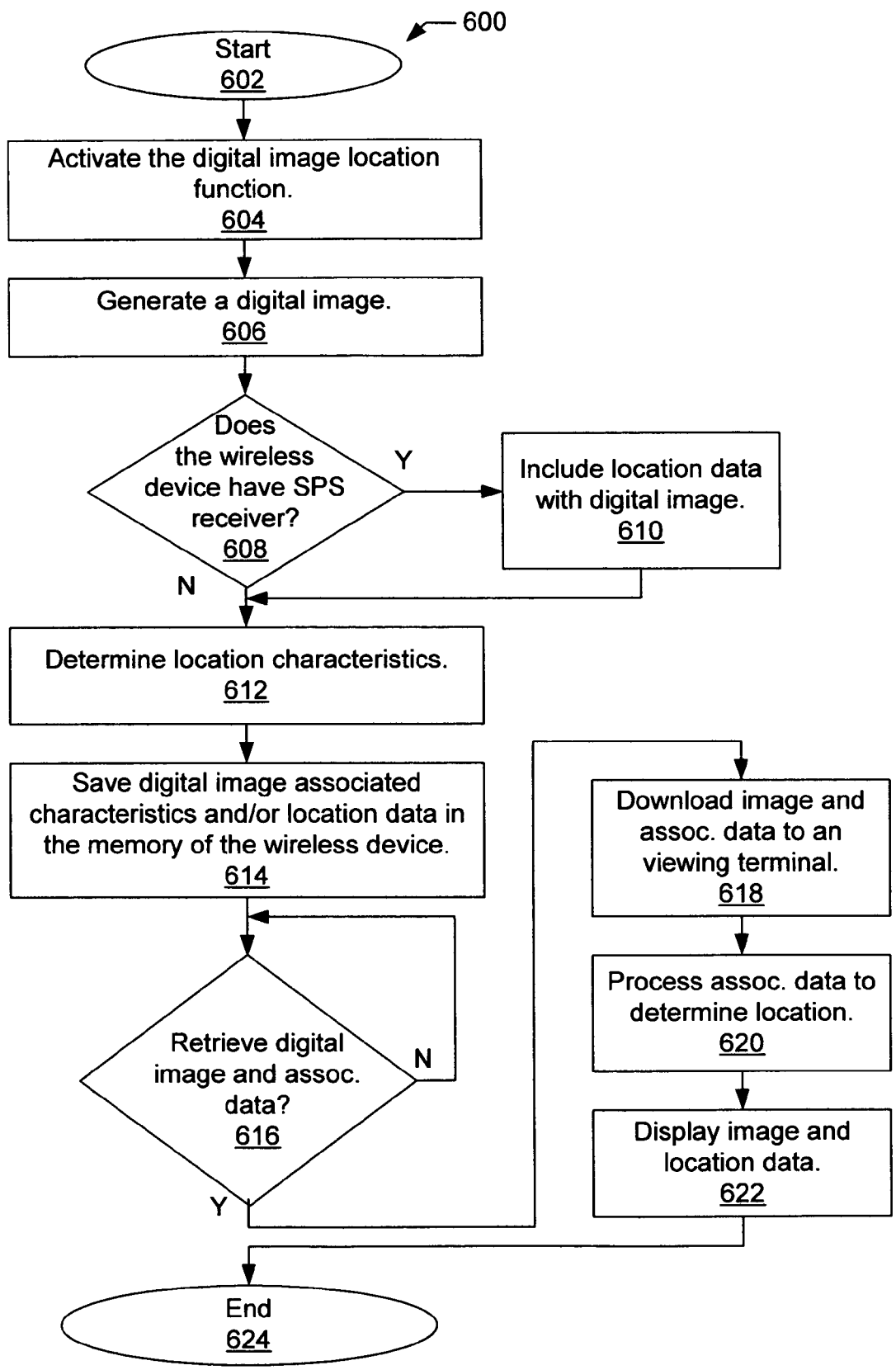
FIG. 6 is a flow diagram of a process of non-real time process of associating location information with an image generated by the wireless device of FIG. 3.

In FIG. 6, a flow diagram 600 of a process of non-real time process of associating location information wit an image generated by the wireless device 102' of FIG. 3 is shown. The wireless device in the current embodiment does not have to have a transceiver 218, codec 212, microphone 214, speaker 216 or microphone 214, for example a digital camera wit a SPS receiver and position computation processor. The device is still a wireless device, but it is a non-real time wireless device. The process starts 602 when the imager 202 is activated 604 via the input unit 208. The imager 202 captures an image and converts it into a digital image 606. If the wireless device 102' has a SPS receiver 608, then the location data is included with the digital image 610. Otherwise, location characteristics are determined 612, for example LORAN data, time, map position. The digital image and associated characteristics and/or location data are saved 614 in the memory 210 of the wireless device 102'. The wireless device 102' may contain one or more digital images in memory 614.

The digital image and associated data may be retrieved upon arriving at a download location 616 (such as viewing terminal 125 or 127), for example at a personal computer, data terminal, wireless modem, etc. If downloading is to occur, then either the wireless device 102' detected a connection to a download location in step 616 or a command was entered via the input unit 208.

The associated location data is processed in step 620 to determine a location 620. The digital image and location data are displayed on the viewing terminal 622, for example viewing terminal 125 or 127. Processing is then complete 624 and may be repeated for other digital images having associated location data and/or location characteristics. Even though wireless device 102' having a SPS receiver 302 was described; in an alternate embodiment a wireless device with the only the ability to collect location characteristics may be used.

Figure 7:
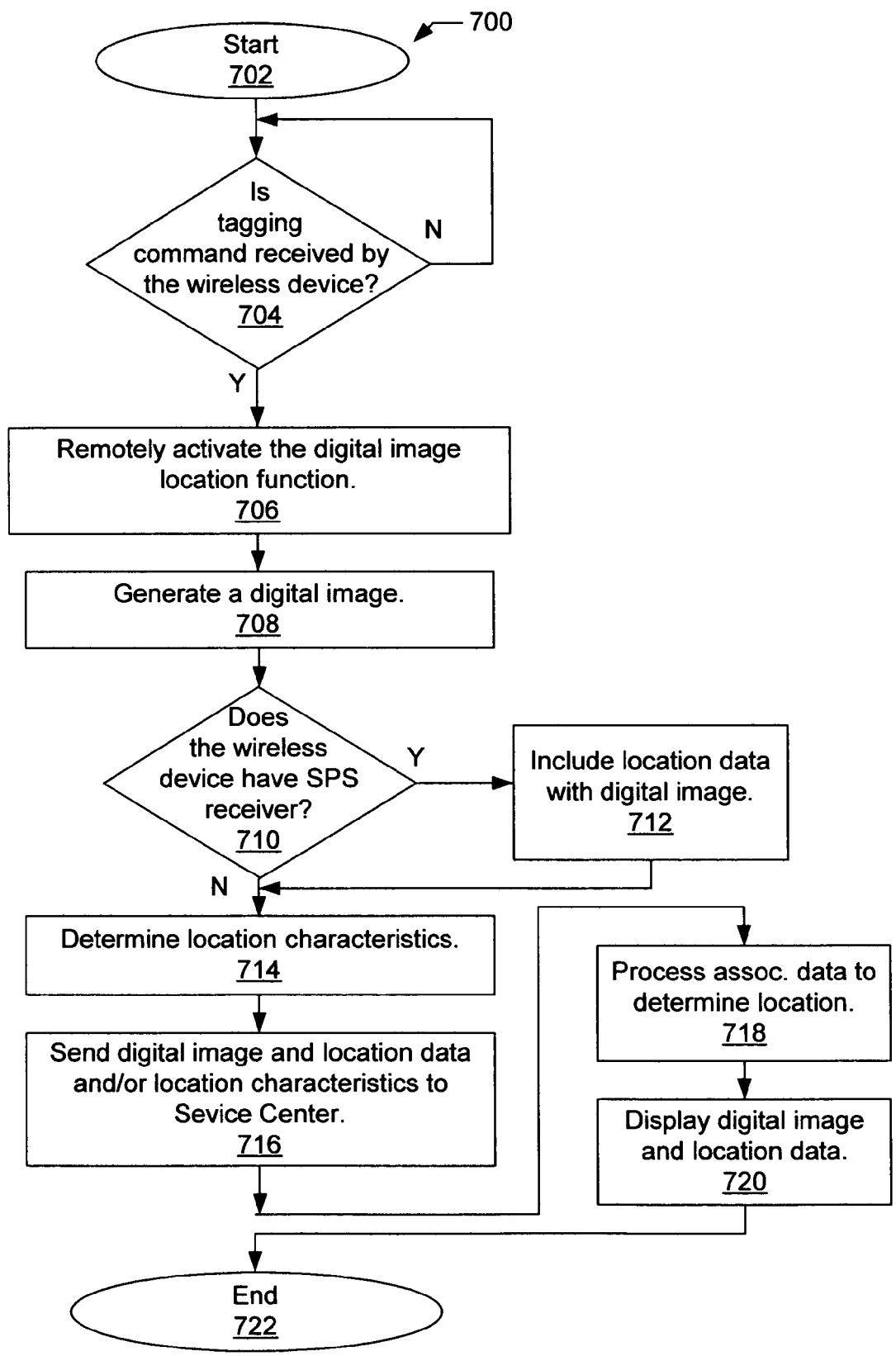
FIG. 7 is a flow diagram of a process of real time tagging of a wireless device of FIG. 3.

Turning to FIG. 7, a flow diagram of a process of real time tagging 700 of a wireless 102'device of FIG. 3 is shown. The wireless device 102' of FIG.3 may be used to tag the location of the wireless device 102'. In such an embodiment, the wireless device 102' is not required to have a display 206, input unit 208, microphone 214 or speaker 216. Tagging is a process where the imager 202 is remotely activated resulting in a digital image and associated location data and/or location characteristics being sent to a service center 120 or viewing terminal 125 or 127. Tagging may be used to locate lost children or adults, track vehicles, and aid law enforcement in retrieving property and locating people.

The process starts 702 with the wireless device 102' determining if a tagging command is received 704 from a service center 120. If a tagging command is not received in 704, then step 704 is repeated. Otherwise, if a tagging command is received in 704, then the digital image location function is activated 706 in response to the service center 120 (hence remote activation).

A digital image is generated 708 by the imager 202. If a SPS receiver 302 is present 710, then location data is included with the digital image 712. Otherwise, location characteristics are determined and associated with the digital image 714.

The digital image and location data and/or location characteristics are sent 716 to the service center 120 via the wireless network 100. The service center 120 then processes the associated data 718 to determine a location of the wireless device 102'. The processing of the data, for example may be by processing the location characteristics, retrieving GFS location data, comparing the digital image to other reference digital images located in a database 122, identifying items in the digital image, or any combination of the above. The digital image is displayed along with the associated location data 720 at the service center 120 and the tagging process is complete 722.

In an alternate embodiment, a terminal in the Internet 126, PSTN 124, or even another wireless device in a wireless network may activate the tagging function. In yet another embodiment, the tagging may be in non-red time with the wireless device stating the digital image and location data and/or location characteristics in memory until a later time when it is downloaded to a viewing terminal 125 or 127.

The processes in FIG. 5, FIG. 6 and FIG. 7 may be performed by hardware or software. If the process is performed by software, the software may reside in software memory (not shown) in the wireless device or wireless network. The software in memory may include an ordered listing of executable instructions for implementing logical functions (i.e., "logic" that may be implemented either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A wireless device, comprising:
    a means for receiving at the wireless device positioning data to determine an approximate location of the wireless device;
    a transceiver capable of data communication with a network;
    an imager capable of capturing a digital image;
    a controller coupled to the means for receiving, the transceiver, and the imager, where the controller associates the digital image with the positioning data and transmits the positioning data and the associated digital image from the wireless device to the network to determine a more precise location of the wireless device than the approximate location based on the combination of the positioning data and the associated digital image; and
    a tagging message received by the transceiver that results in the controller activating the imager.

2. The wireless device of claim 1, where the positioning data is satellite positioning data.

3. The wireless device of claim 1, where the wireless device is a cellular telephone.

4. The wireless device of claim 1, further including a function identifier that is associated with the digital image by the controller.

5. The wireless device of claim 4, where the function identifier is a request for direction.

6. The wireless device of claim 4, where the function identifier is an E911 identifier.

7. A method for position determination of a wireless device, comprising:
    receiving at the wireless device positioning data to determine an approximate location of the wireless device;
    capturing a digital image with an imager;
    associating the positioning data with the digital image resulting in a tagged image;
    transmitting from the wireless device the tagged image to a predetermined device in a network to determine a more precise location of the wireless device than the approximate location based on the combination of the tagged image;
    receiving a tagging message at the wireless device; and
    activating the imager in response to the tagging message.

8. The method of claim 7, where the positioning data is satellite positioning data.

9. The method of claim 7, where transmitting further includes transmitting to a cellular network.

10. The method of claim 7, further including associating a function identifier with the digital image.

11. The method of claim 10, where the function identifier is a request for direction.

12. The method of claim 10, where the function identifier is an E911 identifier.

13. A wireless device, comprising:
    means for receiving positioning data at the wireless device data to determine an approximate location of the wireless device;
    means for capturing a digital image at the wireless device;
    means for associating the positioning data with the digital image resulting in a tagged image;
    means for transmitting the tagged image from the wireless device to a network to determine a more precise location of the wireless device than the approximate location based on the combination of the tagged image; and
    means for receiving a tagging message at the wireless device; and
    means for activating the imager in response to receipt of the tagging message.

14. The wireless device of claim 13, where the positioning data is a Satellite positioning data.

15. The wireless device of claim 13, where the means for transmitting further includes, transmission to a cellular network.

16. The wireless device of claim 13, further indicating means for associating a function identifier with the digital image.

17. The wireless device of claim 16, where the function identifier is a request for direction.

18. The wireless device of claim 16, where the function identifier is an E911 identifier.

* * * * *

UNITED STATES PATENT AND TRADEMARK OFFICE
CERTIFICATE OF CORRECTION

PATENT NO. : 7,630,737 B2
APPLICATION NO. : 11/269126
DATED : December 8, 2009
INVENTOR(S) : Ashutosh Pande and Kanwar Chadha It is certified that error appears in the above-identified patent and that said Letters Patent is hereby corrected as shown below:

Column 3, line 39, insert --)-- after "(AFLT"

Column 3, line 39, delete "))"

Column 5, line 14, delete "220" and substitute --120--

Column 5, line 54, delete "tri-niode" and substitute --tri-mode--

Column 9, line 41, delete "wit" and substitute --with--

Column 10, line 32, delete "GFS" and substitute --GPS--

Column 10, line 42, delete "non-red" and substitute --non-real--

Column 10, line 43, delete "stating" and substitute --storing--

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,630,737 B2 | Page 1 of 2 |
| APPLICATION NO. | : 11/269126 | |
| DATED | : December 8, 2009 | |
| INVENTOR(S) | : Pande et al. | |

It is certified that error appears in the above-identified patent and that said Letters Patent is hereby corrected as shown below:

In the Specification

In Column 1, Line 33, delete "known a" and insert -- known as --, therefor.

In Column 1, Line 40, delete "identity" and insert -- identify --, therefor.

In Column 1, Lines 58-59, delete "public telephone switching network (PSTN)" and insert -- public switched telephone network (PSTN) --, therefor.

In Column 3, Line 34, delete "result" and insert -- result, --, therefor.

In Column 5, Line 4, delete "106 and 106" and insert -- 106 and 108 --, therefor.

In Columns 5 & 6, Lines 67 & 1, delete "electric erasable programmable memory (EEPROM)." and insert -- electriclly erasable programmable read-only memory (EEPROM). --, therefor.

In Column 6, Line 15, delete "convened" and insert -- converted --, therefor.

In Column 6, Line 58, delete "match. it" and insert -- match. It --, therefor.

In Column 7, Line 60, delete "or a" and insert -- or be a --, therefor.

In Column 8, Line 14, delete "to SPS" and insert -- to the SPS --, therefor.

In Column 9, Line 31, delete "218," and insert -- 518, --, therefor.

In Column 9, Line 36, delete "wit" and insert -- with --, therefor.

In Column 9, Line 59, delete "616" and insert -- 618 --, therefor.

Signed and Sealed this
Fourteenth Day of October, 2014

Michelle K. Lee
*Deputy Director of the United States Patent and Trademark Office*

CERTIFICATE OF CORRECTION (continued)
U.S. Pat. No. 7,630,737 B2

In Column 9, Line 62, delete "location 620." and insert -- location. --, therefor.

In Column 10, Line 5, delete "102'device" and insert -- 102' device --, therefor.

In Column 10, Line 6, delete "FIG.3" and insert -- FIG. 3 --, therefor.

In the Claims

In Column 12, Line 41, in Claim 14, delete "Satellite" and insert -- satellite --, therefor.

In Column 12, Line 43, in Claim 15, delete "includes," and insert -- includes --, therefor.

In Column 12, Line 45, in Claim 16, delete "indicating" and insert -- including --, therefor.